United States Patent [19]
Nakajima

[11] Patent Number: 5,408,531
[45] Date of Patent: Apr. 18, 1995

[54] INFORMATION RECORDING/REPRODUCING APPARATUS FOR CONVERTING AND PROCESSING DATA EXCEEDING ERROR CORRECTION ABILITY AT RECORDING

[75] Inventor: Yoshio Nakajima, Higashimurayama, Japan

[73] Assignee: Olympus Optical Co., Ltd., Tokyo, Japan

[21] Appl. No.: 942,264

[22] Filed: Sep. 9, 1992

[30] Foreign Application Priority Data

Sep. 20, 1991 [JP] Japan .................................. 3-241955

[51] Int. Cl.⁶ .................... H04L 9/00; H03M 13/100; G06F 11/10
[52] U.S. Cl. .................................. 380/3; 380/4; 380/9; 380/23; 380/24; 380/49; 380/50; 380/54; 235/379; 235/380; 371/37.1; 371/37.4; 371/37.5
[58] Field of Search ......................... 380/2, 3, 4, 9, 23, 380/24, 28, 49, 50, 54, 25; 235/379, 380; 371/37.1–37.4, 38.1, 37.5

[56] References Cited

U.S. PATENT DOCUMENTS

| | | | |
|---|---|---|---|
| 4,785,361 | 11/1988 | Brotby | 380/4 X |
| 4,788,685 | 11/1988 | Sako et al. | 371/37.5 |
| 4,809,274 | 2/1989 | Walker et al. | 371/37.1 |
| 4,852,101 | 7/1989 | Kobayashi et al. | 371/37.5 |
| 4,903,296 | 2/1990 | Chandra et al. | 380/4 |

Primary Examiner—Bernarr E. Gregory
Attorney, Agent, or Firm—Armstrong, Westerman, Hattori, McLeland & Naughton

[57] ABSTRACT

After an error correcting code is added to a data to be recorded at recording, a data converting process, such as data rotation or data interchange is executed so as to exceed an error correcting ability when the data is reproduced at reproducing, and then the data is recorded on a recording medium. At the time of data reproducing, an inverse data converting process of the data converting process at the time of data recording is executed and then, errors are corrected to restore the data. In a case when the data converting process at reproducing does not coincide with the inverse data converting process at recording, errors exceeding the error correcting ability are generated in most of the cases. Thus, the information recording/reproducing apparatus of this invention has a function for protecting the data.

19 Claims, 13 Drawing Sheets

FIG.16a
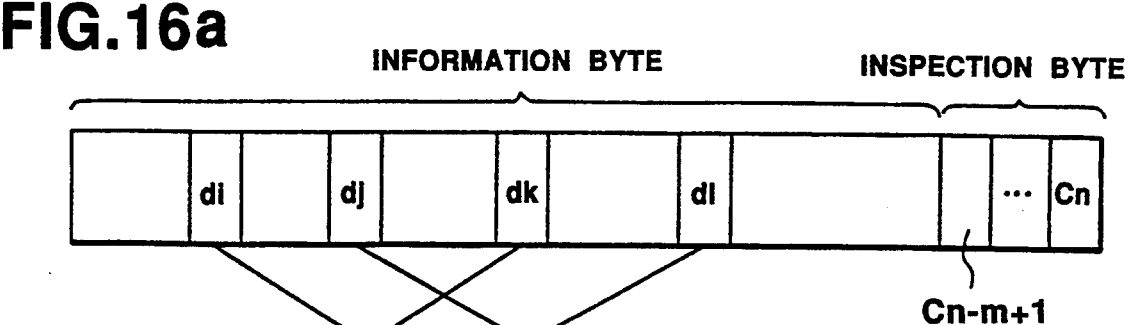
FIG.16b
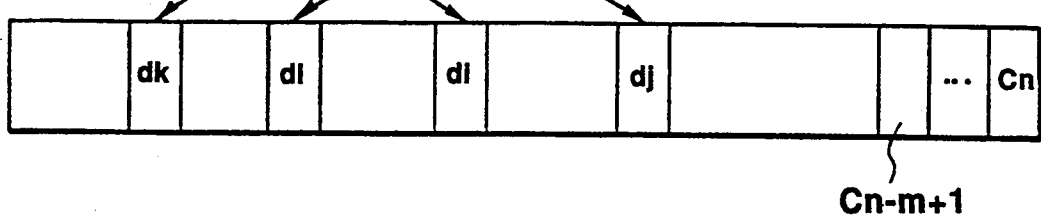
FIG.17a  FIG.17b
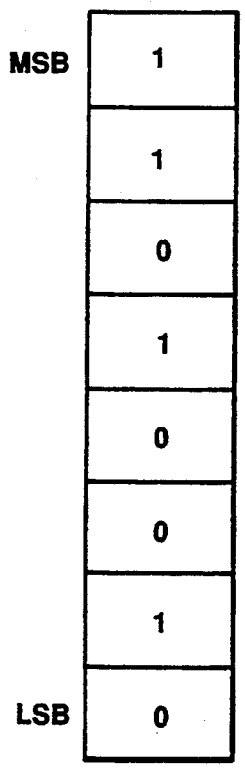
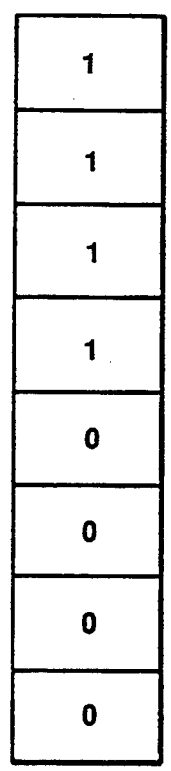

INFORMATION RECORDING/REPRODUCING APPARATUS FOR CONVERTING AND PROCESSING DATA EXCEEDING ERROR CORRECTION ABILITY AT RECORDING

BACKGROUND OF THE INVENTION

1. Field of the Invention

The present invention relates to an information recording/reproducing apparatus which has a protection function for protecting recorded information by executing a data converting process exceeding an error correction ability when the data is recorded.

2. Description of the Related Art

As an information recording/reproducing apparatus for recording and/or reproducing information on an information recording medium, a magnetic recording medium, such as a floppy disk or a magnetic card and an optical recording medium, such as an optical disk or an optical card are used. Although the optical recording medium cannot be rewritten, its large storage capacity permits an extensive application range, such as an optical disk used for recording image information and preserving documents and the optical card used for a bankbook, a portable map and a prepaid card for shopping.

Especially, the excellent portability of an optical card proposes the usage of recording personal information, such as personal health care information. Therefore, a measure for protecting the information peculiar to a person from eyes of others has been considered by encrypting of information.

For example, Japanese Patent Laid-Open No. 2-37527/1990 discloses an example in which a secret code as well as primary card characteristics including a reflectance of an optical card and an amplitude of a recording/reproducing signal are recorded when the optical card is produced or after examined. This prior art shown in FIG. 1 will be explained below.

A track part 92 is provided on an optical card 91. As primary characteristic data of an optical card, a preamble 94 containing GAP, VFO and SYNC, a track number 95, a card type A (format code) 96, a card type B (secret code) 97, a primary reflectance 98, a recording-/reproducing signal amplitude 99 and a post amble 90 as GAP are recorded through a header 93 on the track part 92. The track part 92 has been previously formed in a stamper.

Also, the preamble 94 and the track number 95 may be simultaneously formed in the stamper with the track part 92. As the code used for secret-coding, for example, a rule for rearranging random numbers or numbers and letters can be used. When a pit pattern on an optical card can be easily detected with an optical microscope or the like and the secret code can be decoded, it is possible to choose which secret code for recording information on the optical card in the apparatus is used after several kinds of secret codes are put into a reading/writing apparatus.

There is a possibility that a pit pattern of an optical card on which the secret code obtained as the aforesaid is recorded is detected. Also, because a track or sector on which a secret code is recorded should be previously determined, a format of the optical card easily becomes different from the standard. Therefore, the usable range of the optical card is limited.

In the aforesaid example, generally, a secret number input by a user when the optical card recording/reproducing apparatus is used, and a secret number previously recorded on the optical card are read and compared. When they coincide, it is allowed to record/reproduce a data. When they do not coincide, it is prohibited to record/reproduce a data. Thus, an apparatus which includes the process of comparing such secret numbers with each other has an effect for protecting a data. However, an apparatus which does not include the process of comparing cannot attempt to protect a data, so that the data can be recorded/reproduced without constraints. Even if a data was encrypted, the feature that the data can be reproduced provides a chance for decryption and does not ensure protection of the recorded information.

SUMMARY OF THE INVENTION

An object of the present invention is to provide an information recording/reproducing apparatus for providing protection of a data without requiring a special range for recording a secret code.

Another object of the invention is to provide an information recording/reproducing apparatus for providing protection of a data without being restricted by a format of a recording medium.

When a data is recorded, a process for executing rotation of a byte or a bit unit within a data and replacing a byte or a bit with each other, a process for inverting a bit value based on a rule which determines a bit number and a bit position in a byte or a plurality of byte units or a code unit, and data conversion processing means for combining these processes are provided depending on every application or encryption code set in every recording medium in order to make error correction of a data in an error correcting means impossible. This data conversion processing means replaces data arrangements exceeding the largest error correction ability in reproducing and in recording the data. Therefore, if the rule of the replacement is not known, a data cannot be read, so that the data is securely protected.

BRIEF DESCRIPTION OF THE DRAWINGS

FIGS. 2 to 9 relate to the first embodiment of the present invention;

FIG. 2 is a block diagram showing the structure of an optical card recording/reproducing apparatus of the first embodiment;

FIG. 4 is an explanatory diagram showing a data format of the optical card used in the first embodiment;

FIG. 5 is an explanatory diagram showing a C1 encrypted word in the data format in FIG. 4;

FIG. 7 is a block diagram showing an example of the concrete structure of the first data converting circuit;

FIG. 8 is a block diagram showing an example of the concrete structure of a second data converting circuit;

FIG. 9 is a block diagram showing the structure of an optical card recording/reproducing apparatus of a modified example of the first embodiment;

FIGS. 16a and 16b makes up an explanatory diagram showing an example of data conversion due to data replacement within an information byte by the first data converting circuit;

FIGS. 17a and 17b makes up an explanatory diagram showing an example of data conversion due to bit inversion by the first data converting circuit.

DETAILED DESCRIPTION OF THE PREFERRED EMBODIMENTS

The embodiments of the present invention will be explained below in reference to the drawings.

Figure 2:
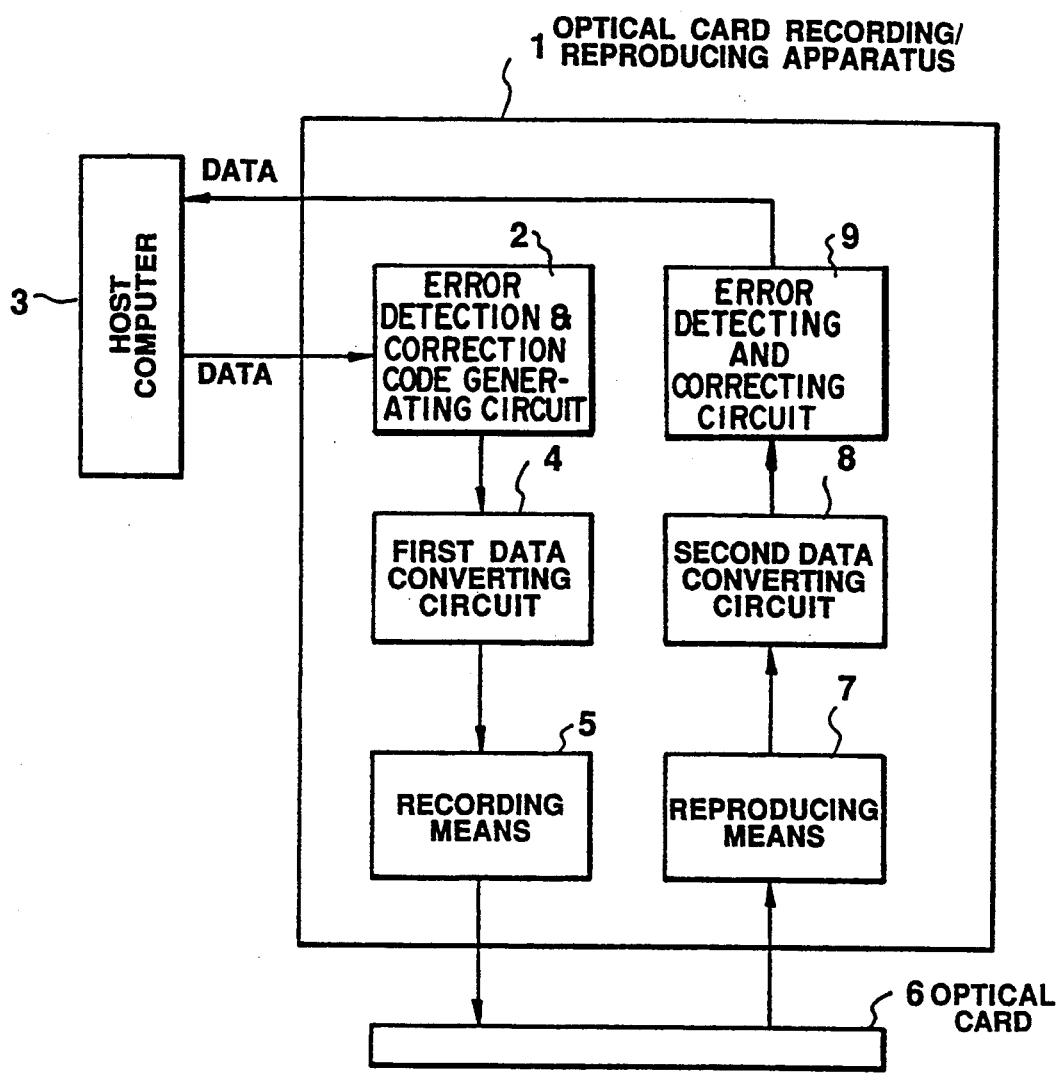

As shown in FIG. 2, an optical card recording/reproducing apparatus 1 of the first embodiment includes a function for recording information (data) on an optical card 6 and a function for reproducing the data recorded on the optical card 6.

The optical card recording/reproducing apparatus 1 has a coding circuit 2 which generates an error detection and correction code. A data to be recorded is transmitted from a host computer 3 to the coding circuit 2 during recording. After adding an inspection byte which becomes an error correcting code for the transmitted data, the coding circuit 2 transmits the transmitted data to a first data converting circuit 4. The first data converting circuit 4 executes a data converting process, including data rotation exceeding an error correcting ability during reproducing, data replacement and bit inversion or a combination of these processes. The data executed by the process is sent to recording means 5 and the data is recorded on the optical card 6 as a recording medium by the recording means 5.

The data recorded on the optical card 6 is read by reproducing means 7 during reproducing and transmitted to a second data converting circuit 8, which provides a decryption operation on the transmitted data. The second data converting circuit 8 has a data conversion processing function which can perform an inverse process of the process conducted in the aforesaid first data converting circuit 4 at recording, that is, the function executes a process for making the data processed by rotation, replacement and bit inversion to restore the original data.

The data executed by the process is transmitted to a decoding circuit 9 for detecting and correcting errors in the transmitted data. Then, error correction is applied to the data to restore the data transmitted from the host computer 3 to the encrypting circuit 2. The restored data is transmitted to the host computer 3. At that time, if the error in the decrypting circuit 9 cannot be corrected, the data is prohibited from being transmitted to the host computer 3.

Figure 3A:
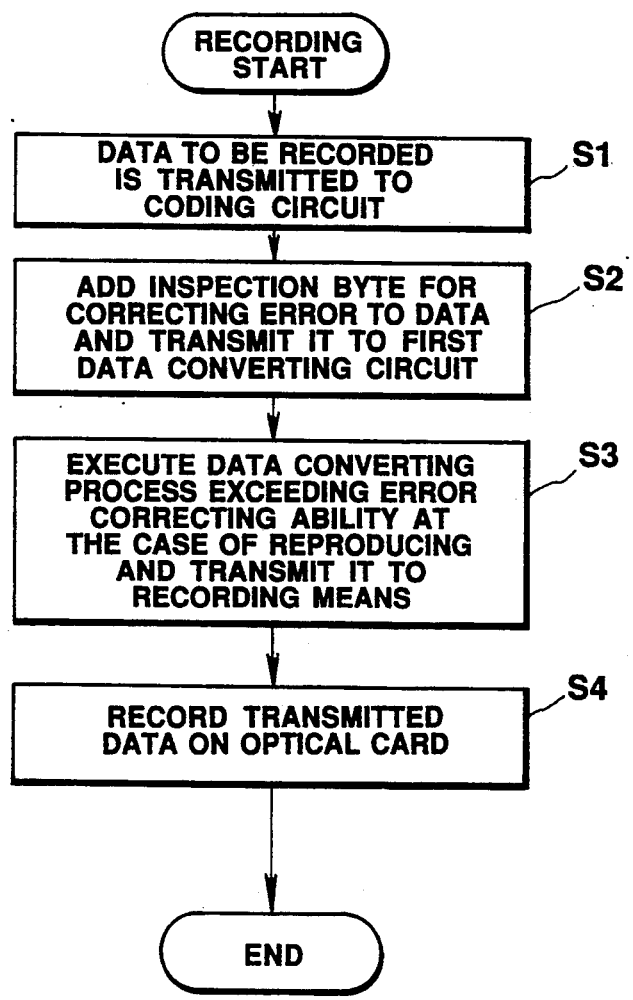
FIGS. 3a and 3b are flow charts showing recording and reproducing operations of the first embodiment, respectively.
Figure 3B:
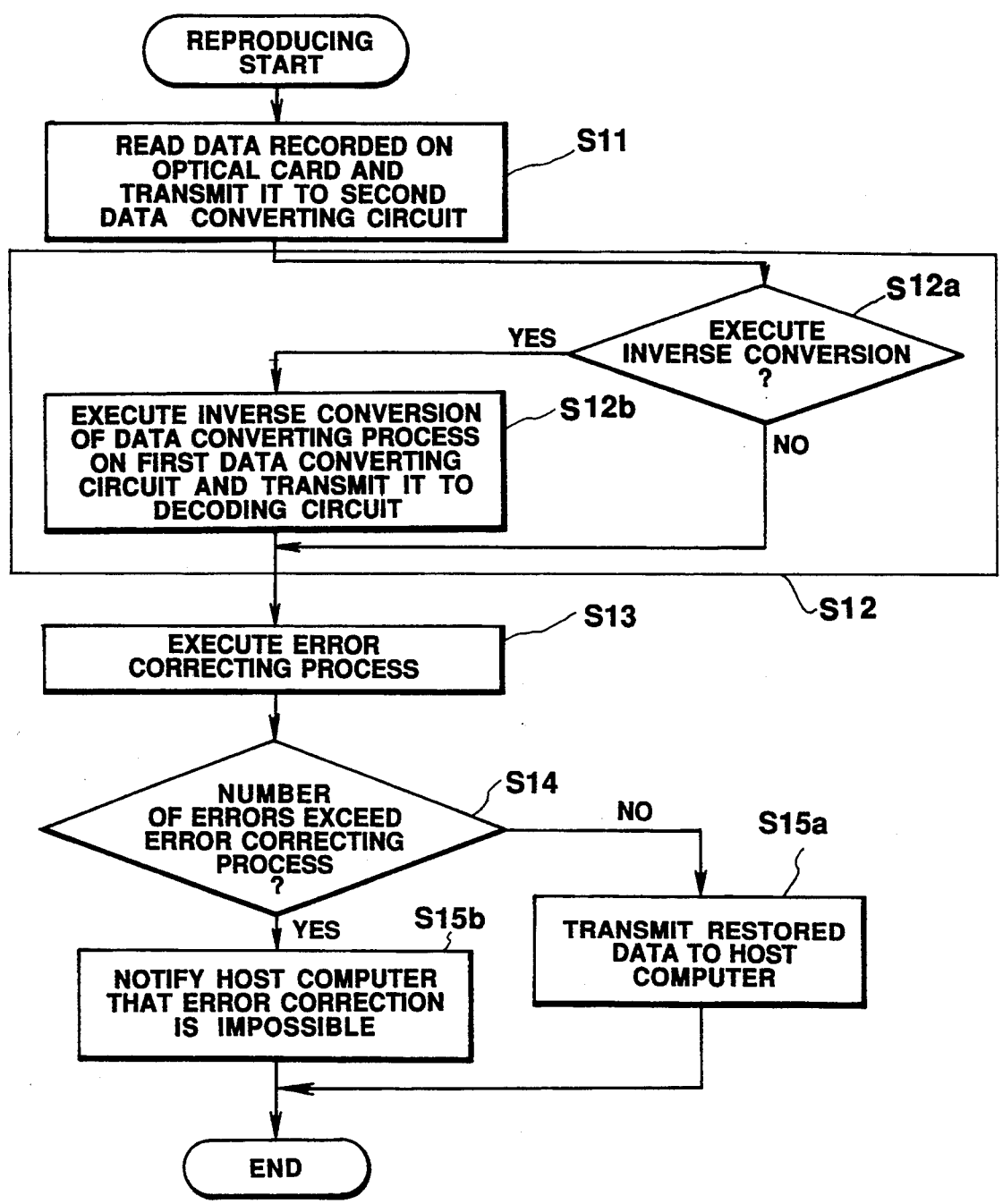

FIGS. 3a and 3b illustrate the recording and reproducing operations in the optical card recording/reproducing apparatus 1 in FIG. 2, respectively. When the recording operation starts, the data to be recorded is transmitted from the host computer 3 to the encrypting circuit 2, as shown in Step S1. After an inspection byte which becomes an error correcting code for permitting error correction of the data is added by the circuit 2, the data is transmitted to a first data converting circuit 4, as shown in Step S2. The first data converting circuit 4 executes a data converting process, a kind of encryption, which exceeds an error correcting ability during reproducing and transmits the processed data to the recording means 5, as shown in Step S3. The data is recorded on the optical card 6 by the recording means 5, as shown in Step S4.

When a reproducing operation starts, the data recorded on the optical card 6 is read by the reproducing means 7, as shown in Step S11. After the data is converted into electric signals, the signals are transmitted to a second data converting circuit 8 for decryption. As shown in Step S12, when the inverse conversion is required, as shown in Step S12b, depending on whether or not the inverse conversion commanded by the host computer is required, the second data converting circuit 8 executes an inverse process of the process performed in the first data converting circuit 4 during recording, that is, a process for restoring the original data is executed, and the data is transmitted to the decoding circuit 9. As shown in Step S12a, when it is not required, the data is transmitted to the coding circuit 9 without processing the inverse conversion.

As shown in a Step S13, the decrypting circuit 9 processes error correction, that is, it restores the data. In this case, it is judged whether or not the number of errors exceeds the number of errors which can be corrected. In the case of the number of errors being able to be corrected, errors in the transmitted data can be corrected. Therefore, the error correcting process is operated and then, the decrypting circuit 9 transmits the restored data to the host computer 3 to terminate the reproducing operation, as shown in Step S15a.

On the other hand, in the case of the number of errors exceeding the number of errors being able to be corrected, the original data cannot be reproduced, so that the host computer 3 is reported that the decoding circuit 9 cannot correct errors or reads errors, as shown in Step S15b. Then, the data reproducing operation is suspended because of the errors and terminated. That is, the reproducing operation is terminated (suspended and terminated) without transmitting the data recorded on the optical card 6 to the host computer 3.

Figure 1:
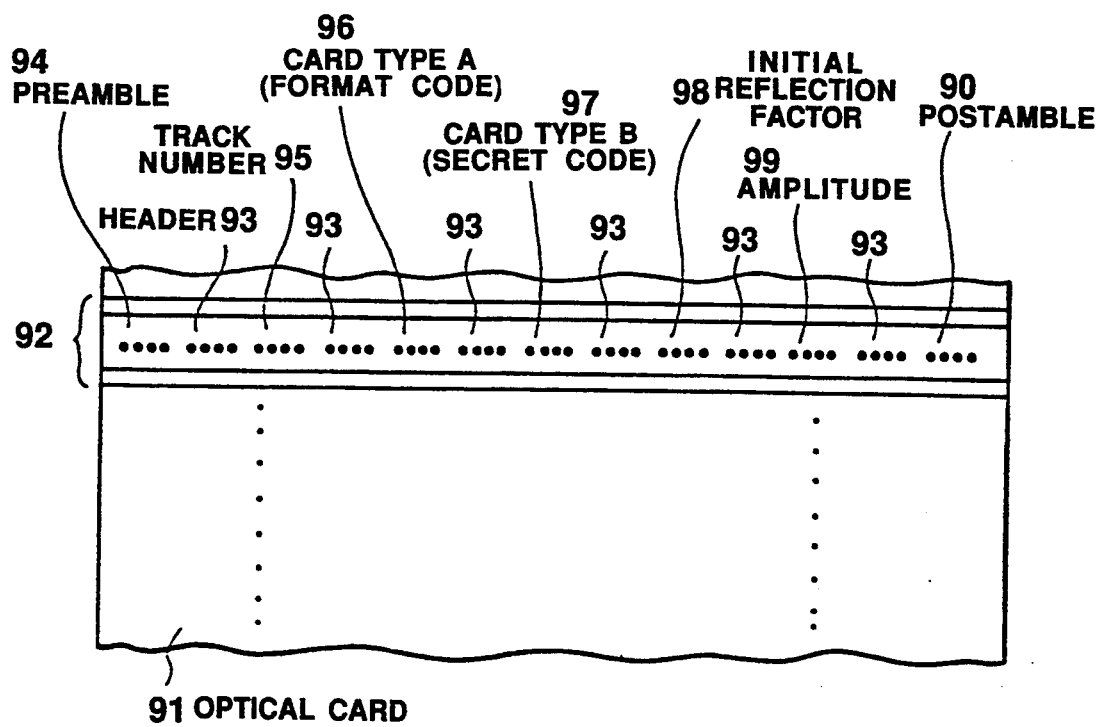
FIG. 1 is an explanatory diagram showing a data recorded on the optical card in the prior art.
Figure 4:
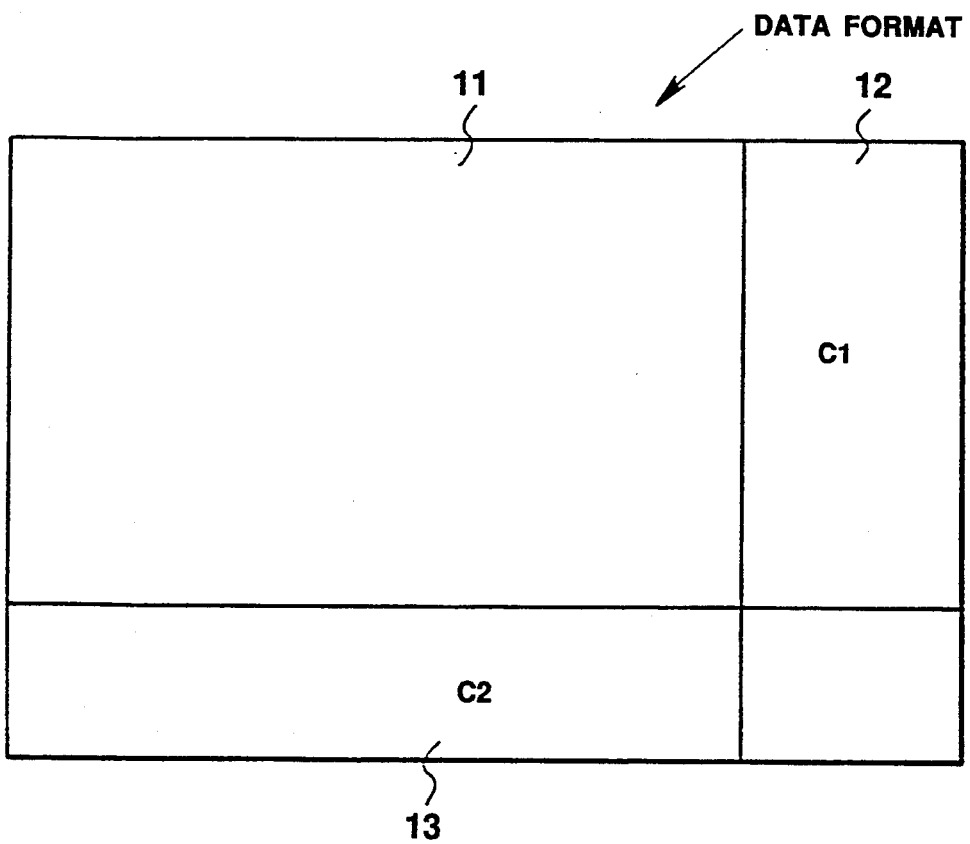

FIG. 4 is an example of a data format to be recorded on the optical card 6 used in the first embodiment. Reference numeral 11 is a part in which user data (information bytes) are arranged like a lattice. 12 is a part of an inspection byte (C1 encryption code) added to the user data 11 in the horizontal direction. 13 is a part of the inspection byte (C2 code) added to the user data 11 in the lengthwise direction. FIG. 4 shows a conceptual diagram of the ordinary product encryption code as a whole. The C1 code and C2 code are obtained so that the result is zero when a predetermined parity check matrix H is multiplied by code words, respectively.

Figure 5:
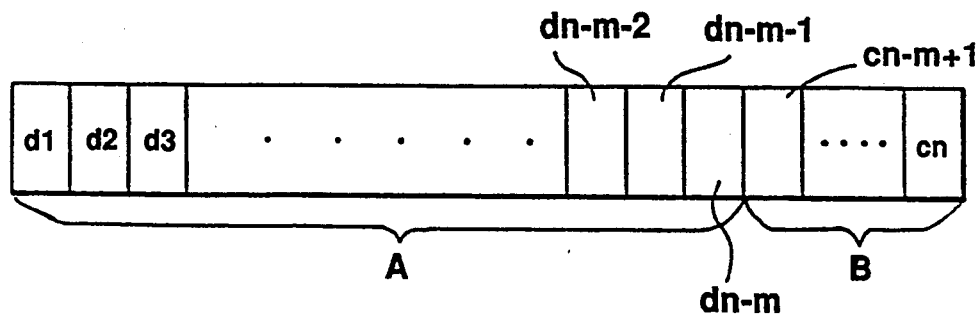

FIG. 5 illustrates a matrix in FIG. 4, in other words, an extracted C1 code word. A is a user data, that is, an information byte. B is an inspection byte calculated on the basis of an information byte. Here, if a Reed-Solomon code is considered as an example, the aforesaid parity check matrix H is $$H = \begin{pmatrix} 1\alpha & \cdots & \alpha^{n-1} \\ 1\alpha^2 & \cdots & \alpha^{2(n-1)} \\ \cdot & & \cdot \\ \cdot & & \cdot \\ \cdot & & \cdot \\ 1\alpha^m & \cdots & \alpha^{m(n-1)} \end{pmatrix} \quad (1)$$

Thus, inspection byte $c=(cn-m+1, cn-m+2 \ldots cn-1, cn)$ can be obtained so as to make the formula as follows, $$H(d1, d2 \ldots cn-m+1 \ldots cn)=0 \quad (2)$$

for information byte $d=(d1, d2 \ldots dn-m-1, dn-m)$ and inspection byte $c=(cn-m+1, cn-m+2 \ldots cn-1, cn)$.

The coding circuit 2 adds the inspection byte c to the information byte d and transmits the byte d to the first data converting circuit 4. The first data converting circuit 4 executes a process including rotation or replacement of the data in the information byte d. This process is executed so as not to make the formula (2) valid and performs the rotation or replacement of data in the range exceeding the (largest) error correcting ability which can be corrected by the decoding circuit 9.

Accordingly, if the rule of the process of rotation and replacement of the data is not known, the formula (2) is not valid in spite of executing reproduction. Also, an error exceeding the error correcting ability is detected, so that the data cannot be read because the data cannot be corrected. Thus, the data can be protected.

FIG. 6 shows an example of the case in which a data of the information byte has high randomness as an example of the process by the first data converting circuit 4. If the rotation is performed within the information byte, there is a high probability in which each data of the information byte is different from the original data. Therefore, the aforesaid formula (2) can be made invalid in each code word. Also, because the condition making the formula invalid is to exceed the largest number of errors which can be corrected by the error correcting ability, errors cannot be corrected in the decoding circuit 9 at reproducing in an optical card recording/reproducing apparatus excluding the second data converting circuit 8 or an apparatus decoding by a different rule, so that the data cannot be reproduced correctly.

Figure 6A:
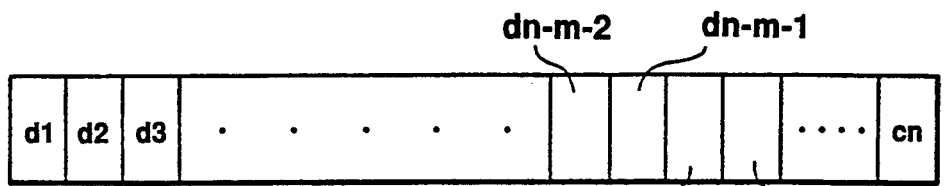
FIGS. 6a and 6b makes up an explanatory diagram showing an example of data conversion by a first data converting circuit.
Figure 6B:
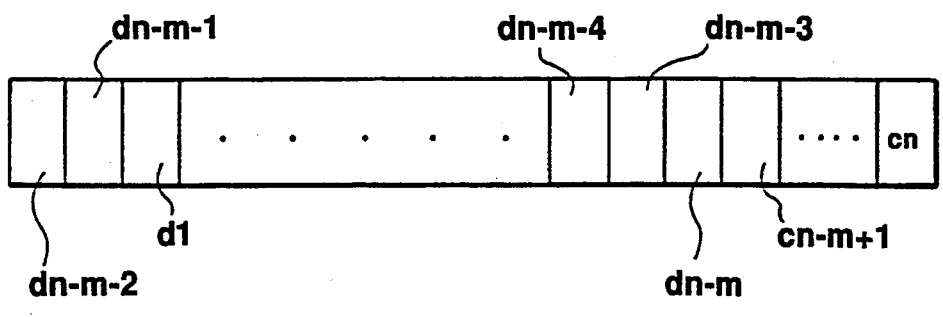

If an example in FIG. 6 is explained in detail, FIG. 6a illustrates a data arrangement before rotation $(d1, d2 \ldots dn-m-2, dn-m-1, dn-m)$ denotes an information byte and $(cn-m+1 \ldots cn)$ denote an inspection byte added for correcting errors. FIG. 6b illustrates a result of converting process in which two bytes rotation in the right direction is executed for the information byte of $(d1, d2 \ldots dn-m-2, dn-m-1)$ shown in FIG. 6a.

For example, if m bytes of the inspection byte are added, errors up to m/2 bytes can be detected and corrected in the Reed-Solomon code. Generally, the relation between the number $(n-m)$ of information byte and the number m of inspection byte is shown as $(n-m)>m$, therefore, there is a high probability that whole information bytes become errors if the rotation is performed as shown in FIG. 6b, so that about $(n-m)$ of the generation of errors can be expected.

Accordingly, the relation is shown as $(n-m)>m/2$. The errors cannot be corrected because the number of error bytes exceeds m/2 bytes of the error correcting ability. Also, when there are many identical data in the information byte, $(n-m)$ errors are certainly generated if at least a bit of each byte in the information data after rotation is inverted.

Figure 7:
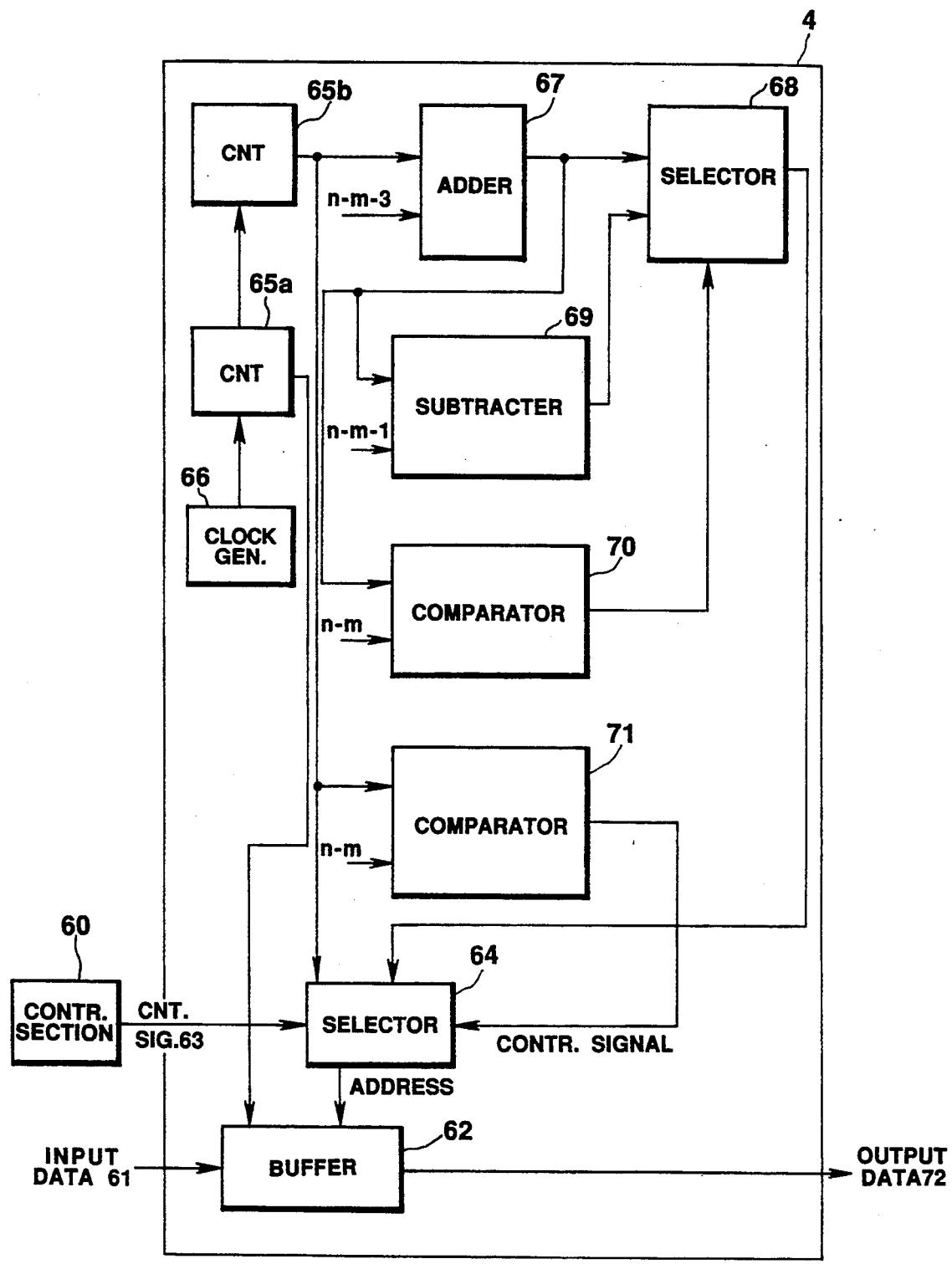

An example of the concrete structure of the first data converting circuit 4 for converting a data by rotating data arrangements, as shown in FIG. 6, is shown in FIG. 7.

The output data from the coding circuit 2 is supplied to the first data converting circuit 4 as an input data 61 and written in a buffer 62 in which a data of the C1 code word of n bytes. At that time, the operation for writing a data in the buffer 62 is performed by applying the output of a second counter 65b to a buffer 62 as a byte address through a first selector 64 which is selected and controlled according to a control signal 63 from a control part 60 (of the optical card recording/reproducing apparatus 1).

The aforesaid counter 65b counts a clock pulse from a clock circuit 66. A carry pulse of a first counter 65a determining a bit address is supplied to the counter 65b. The first counter 65a is a counter of eight bits. The output of the first counter 65a is used in a bit address of the buffer 62. Also, the first counter 65a outputs the carry pulse at intervals of eight clock pulses, that is, one byte. The carry pulse is applied to a clock input end of the second counter 65b.

The second counter 65b makes an output number increment in every input carry pulse. Accordingly, when an output data from the coding circuit 2 is written in the buffer 62, the data is written in from the first address in turn. When the data is read from the buffer 62, the data rotated by a byte unit is output as follows.

The output from the counter 65b is supplied to an adder 67 and added to a numerical value data $(n-m-3)$. The output from the adder 67 enters a second selector 68, a subtracter 69 and a first comparator 70, respectively. The output from the adder 67 and a numerical value data $(n-m)$ are compared by the comparator 70. If the output from the adder 67 is smaller than $(n-m)$, the output from the adder 67 is selected by a second selector 68.

That is, when the output of the counter 65b is 1 and 2 in this example, the output of the adder 67 becomes $(n-m-2)$ and $(n-m-1)$, respectively. Then, these values are selected and supplied from the second selector 68 to the first selector 64. On the other hand, when the output of the adder 67 is $(n-m)$ or more, the result in which $(n-m-1)$ is subtracted by the subtracter 69 is output from the second selector 68 in accordance with the output of the comparator 70.

For example, if the output of the adder 67 is $(n-m)$ and $(n-m-1)$, the output of the subtracter 69 becomes 1 and 2, and then, 1 and 2 are output from the selector 68.

Thus, if the counter 65b makes its output increment as 1, 2, 3 . . . (n−m−1), the output of the selector 68 becomes (n−m−2), (n−m−1), 1, 2 . . . (n−m−3).

When the data from the buffer 62 is read, the first selector 64 selects the output of the second selector 68 in accordance with the control signal 63. Then, the data executed two bytes rotation is read from the buffer 62 and an output data 72 is supplied to the recording means 5. Also, the output of the counter 65b is supplied to a second comparator 71 and compared with the numerical value (n−m). When the output of the counter 65b becomes (n−m) or more, the control signal is provided to the first selector 64 and the selector 64 selects a value of the counter 65b.

Accordingly, when the output of the counter 65b becomes (n−m) or more, the value of the counter 65b is provided to the buffer 62 as an address as it is. Therefore, the address of the inspection byte does not change. In this way, the data arrangement of FIG. 6a is converted as that in FIG. 6b and transmitted to the side of the recording means 5.

In the structure shown in FIG. 7, address conversion is performed when the data from the buffer 62 is read; however, the address conversion of the data may be performed when written in the buffer 62.

In the apparatus 1 shown in FIG. 2, if a correct secret number is input at reproducing, the second data converting circuit 8 executes a process for making the data shown in FIG. 6b restore the data shown in FIG. 6a. In this case, even if a few reading errors are brought about at reproducing by the reproducing means 7, the errors are corrected by the decoding circuit 9 and the data before recording can be reproduced.

Figure 8:
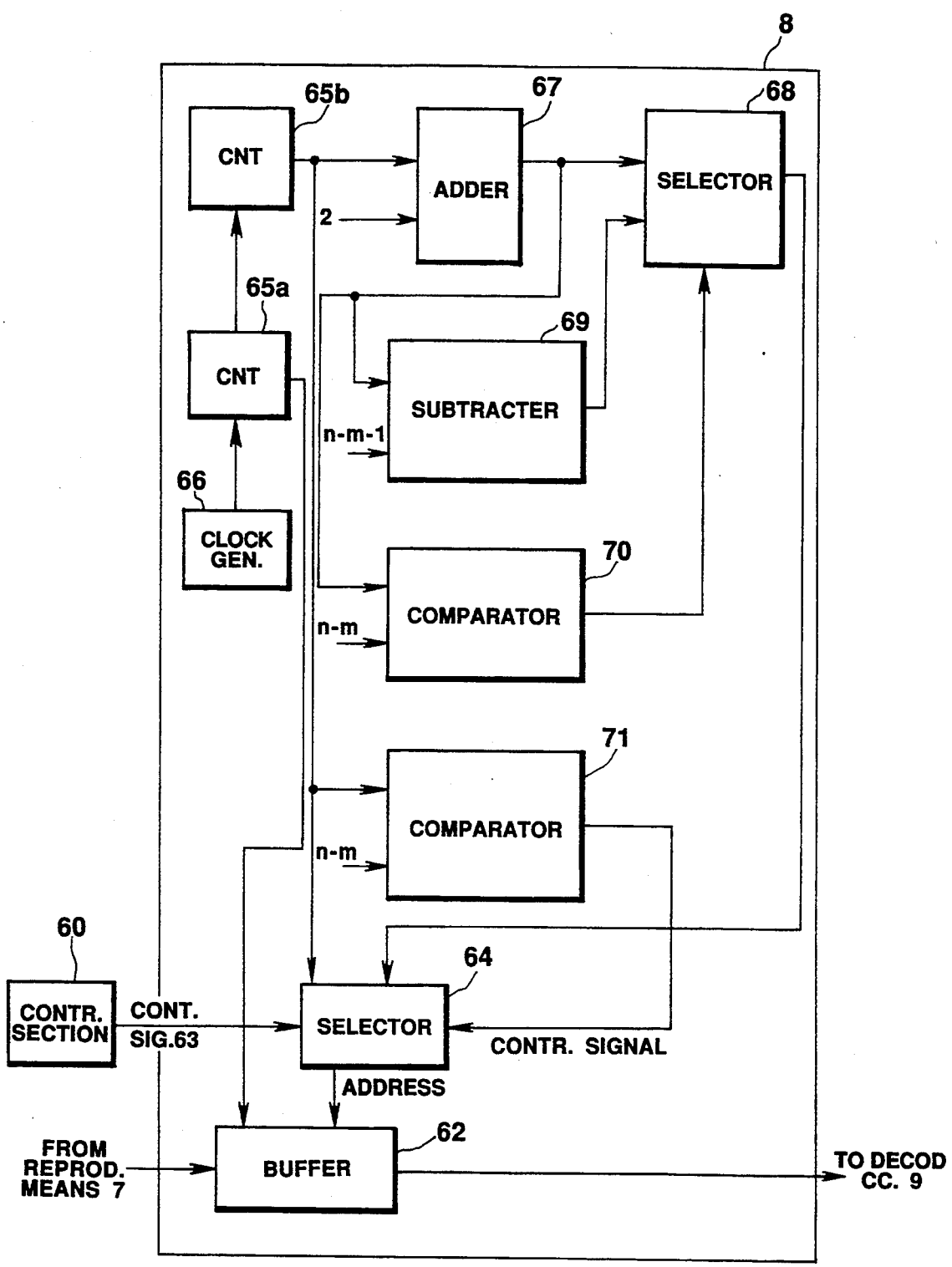

FIG. 8 shows a structure of the second data converting circuit 8 for converting the data of FIG. 6b into the data of FIG. 6a. This structure is almost the same as that of FIG. 7 and explained using the same codes. The data read from the optical card 6 through the reproducing means 7 is recorded by the control of a control part 60 in the buffer 62 in turn. The arrangements of the data recorded in the buffer 62 in turn are converted using an address of the counter 65b or the like when the data is read and then, supplied to the decoding circuit 9. In the case of reading, the numerical value data of the adder 67 is set as 2 in FIG. 7. The others are the same.

In this case, when 1, 2, 3 . . . n−m−3, n−m−2, n−m−1, n−m . . . are output from the counter 65b, 3, 4, 5 . . . n−m−1, n−m, n−m+1, n−m+2 . . . are output from the adder 67. When the output value of the counter 65b is up to (n−m−3), the outputs 3, 4, 5 . . . n−m−1, of the adder 67 are applied to the buffer 62 through the selectors 68 and 64.

When the output value of the counter 65b is (n−m−2) or (n−m−1), the output 1 and 2 of the subtracter 69 is applied to the buffer 62 through the selectors 68 and 64. Further, when the output value of the counter 65b is (n−m) or more, the selector 64 is changed over by the comparator 71 and the output n−m . . . of the counter 65b are applied to the buffer 62.

Thus, 3, 4, 5 . . . n−m−1, 1, 2, n−m . . . are applied to an address terminal for the buffer 62. That is, the data (d1, d2, d3 . . . dn−m−1, dn−m . . . cn) are output in turn.

According to the first embodiment, a data is recorded after the data is processed, for example, rearrangement, in the first data converting circuit 4 in the optical card recording/reproducing apparatus 1, so that recorded data cannot be reproduced because the errors exceeding the error correcting ability are generated at an error correcting process in the decoding circuit 9 unless the apparatus includes a reproducing function for substantially processing the inverse conversion of the process. Therefore, it is substantially impossible to reproduce a data in an apparatus except for the apparatus of the aforesaid first embodiment. Thus, the recorded data can be securely protected.

Further, according to the embodiment, a data converting process for encryption, such as data rearrangement, is executed. Since the amount of data is made to be unchanged before and after the data conversion, it is not necessary to record a secret data on the optical card 6 in addition to the data to be recorded including a code for correcting errors and also to keep a recording range for writing such a secret data. Accordingly, the data recording range does not become smaller because of the secret data recording range.

Furthermore, according to the embodiment, only the arrangement of the data to be recorded on the optical card 6 is changed, so that the amount of the data becomes the same amount as in the case in which the arrangement is not changed. Therefore, it can be also applied to a case in which a data format in a track of a recording medium (in this case, the optical card 6) is opened to the public (normalized recording format or the like). The recorded data can be also securely protected.

It is explained in the first embodiment that the data converting circuit 4 is set to convert data exceeding the largest error correcting ability of the decoding circuit 9 by data rearrangement. Also, in the case in which other decoding means is considered, the information number of the inspection information used at the time of recording (for example, a byte number when converted using a byte unit and a bit number when converted using a bit unit) may be set to the number of data conversion exceeding the number of information so as to make error correction impossible-securely.

The number of data conversion by the first data converting circuit 4 may be set depending on the information number of the inspection information. In this case, the second converting circuit 8 executes the inverse conversion of the first data converting circuit 4 as a matter of course.

Figure 9:
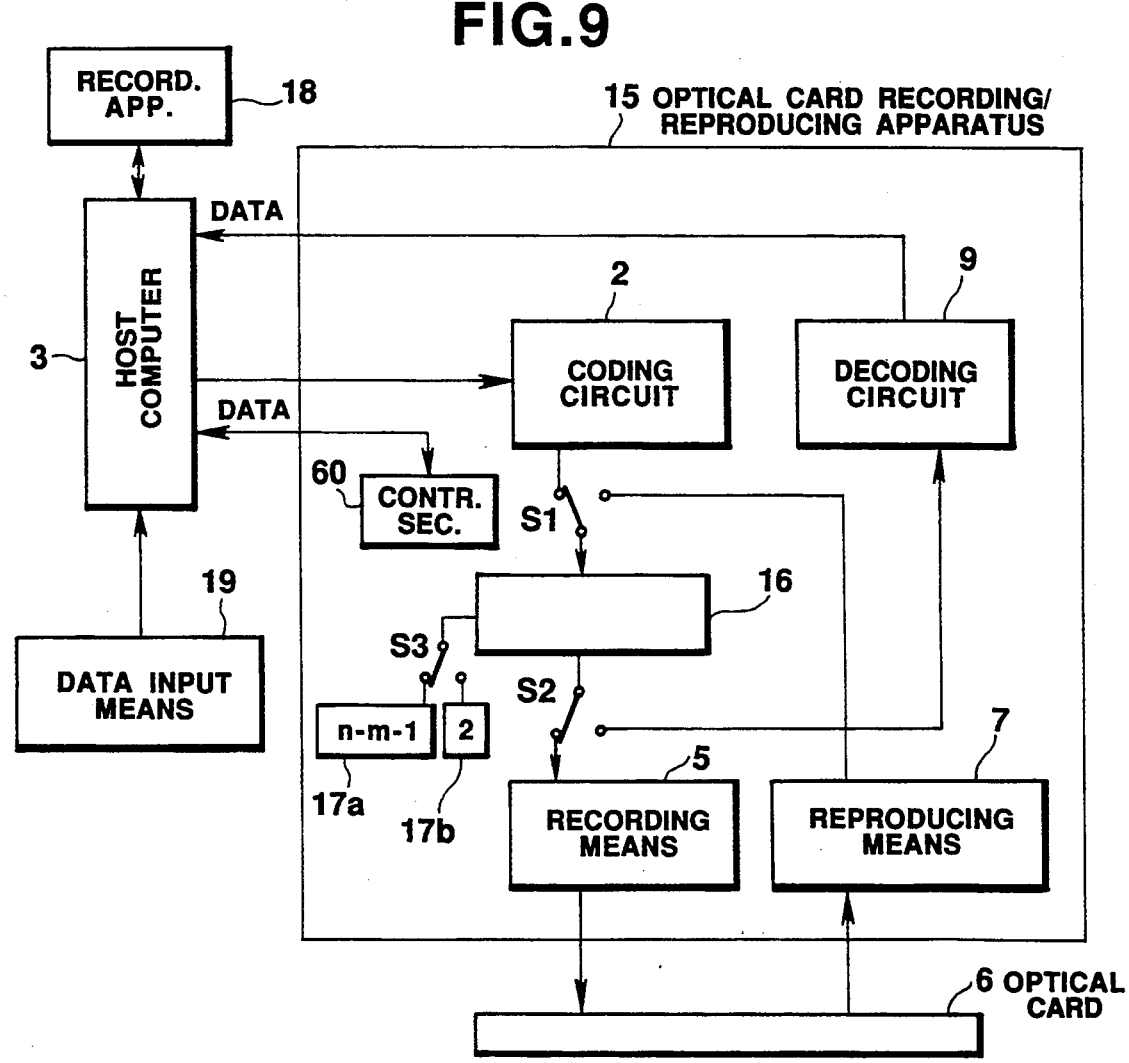

FIG. 9 shows an example of transformation of the first embodiment. In an optical card recording/reproducing apparatus 15 of the transformation example, a first data converting circuit 4 and a second data converting circuit 8 are composed of a common data converting circuit 16 and functions as the first data converting circuit 4 by changing over a switch and a preset data at recording and functions as the second data converting circuit 8 at reproducing. That is, as shown in FIG. 9, switches S1 to S3 are set to be changed over at recording and changed over to the opposite connecting point side at reproducing. Also, (n−m−1) is applied to a subtracter 69 from a numerical value data generator 17a at recording by the switch S3 and 2 is applied to the subtracter 69 from a numerical value data generator 17b at reproducing. Also, the switches S1-S3 are changed over by, for example, a control part 60. The control part 60 is connected to a host computer 3 and controls each part of the optical card recording/reproducing apparatus 15.

Also, in this transformation example, the information specifying an individual of a secret number of an owner (user) of an optical card 6 is recorded in a recording device 18 in the host computer 3 corresponding to a registration number previously recorded on the optical card 6 when the optical card 6 is issued. The registration number is recorded in a predetermined range, for example, without converting data. Then, when a user of the optical card 6 records or reproduces a data, a secret number is input by data inputting means 19, such as a keyboard, so that the secret number is input to the host computer 3.

The host computer 3 refers to a registered number which is read from the optical card 6 through the reproducing means 7 and judges whether the registration number coincides with the secret number recorded in the recording device 18 or not. If they coincide, the computer receives the record or reproduction of a data. If they do not coincide, it does not receive the record or reproduction of a data.

The other formations are identical to those of the first embodiment. In this transformation example, whether the secret numbers coincide or not is judged in the process before Steps S1 and S11 in FIGS. 3a and 3b. If they coincide, the operations for recording and reproducing are performed. The other operations are almost identical to those of the first embodiment.

According to the transformation example, since the first data converting circuit 4 and the second data converting circuit 8 can be composed of the common data converting circuit 16, the structure can be simple and actualized by inexpensive costs.

Further, a rule of data conversion is set in every optical card recording/reproducing apparatus 15 in this transformation example similar to the first embodiment. However, this transformation example does not receive the record or reproduction of a data, that is, the optical card recording/reproducing apparatus 15 cannot be used unless a user of the optical card 6 does not use a correct secret number. Therefore, it has a protection function for the case when a user except for the user of the optical card 6 uses the card.

In the aforesaid first embodiment, a rule for data conversion by rearrangement of a data, such as data rotation is provided in each optical card recording/reproducing apparatus 1. It can be also operated as follows. That is, a plurality of different data converting means are provided in the optical card recording/reproducing apparatus and a plurality of data converting modes within the optical card recording/reproducing apparatus are specified by providing the mode for designating a converting rule of the data converting means in a recording/reproducing command from the host computer, so that the data cannot be reproduced if a designated mode from the host computer is different even if the optical card recording/reproducing apparatus is identical at both cases of recording time and reproducing time, and that the data can be protected as in the first embodiment.

Figure 10:
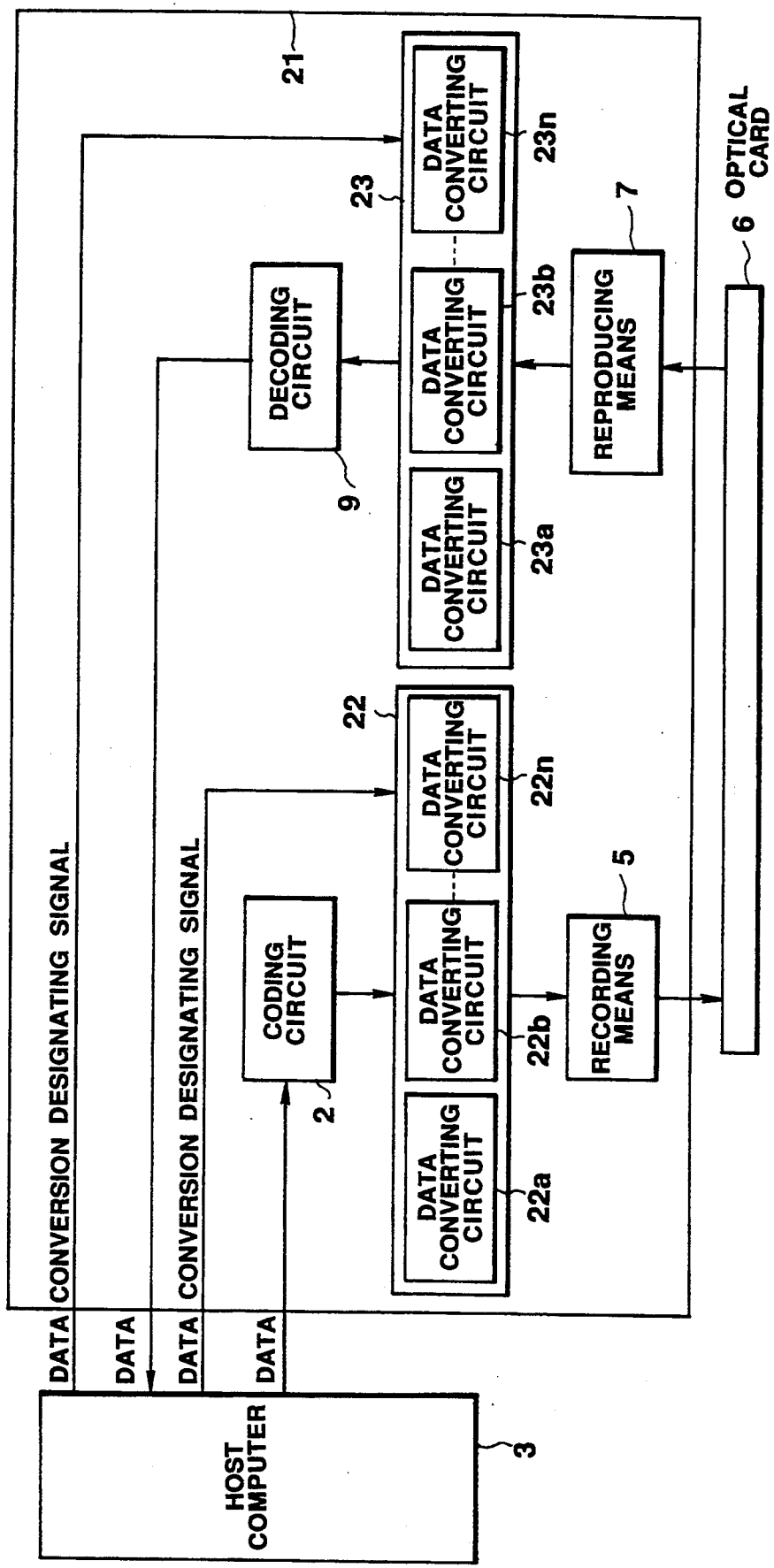
FIG. 10 is a block diagram showing the structure of an optical card recording/reproducing apparatus in the second embodiment of the invention.

Based on FIG. 10, an optical card recording/reproducing apparatus 21 of the second embodiment of the invention will be explained below. In this apparatus 21, first data converting means 22 composed of a plurality of data converting circuits 22a, 22b . . . 22n instead of the first data converting circuit 4 is used in the apparatus 1 of the first embodiment shown in FIG. 2 and further, second data converting means 23 composed of a plurality of data converting circuits 23a, 23b . . . 23n instead of the second data converting circuit 8 is used.

A data converting mode designating signal is supplied to the first data converting means 22 from a host computer 3. By the data converting mode designating signal, a data converting circuit 22i (i is one of a, b . . . n) actually converting data in the first data converting means 22 is designated. Also, the data converting mode designating signal is supplied to the second data converting means 23 from the host computer 3. By the data converting mode designating signal, a data converting circuit 23i converting data in the second data converting means 23 is designated. The other formations are the same as those in FIG. 2 and the same sign is given to the same formation element.

In this formation, a mode of data conversion algorithm is sent to an optical card recording/reproducing apparatus 21 from the host computer 3 as a command with a data to be recorded. The data to be recorded is transmitted to a coding circuit 2 as shown in the first embodiment. Also, a command for the mode of data converting algorithm is transmitted to the first data converting means 22.

The first data converting means 22 receives the mode of data conversion from the host computer 3 and a data converting circuit 22i, that is, a data converting algorithm is selected among a plurality of data converting circuits 22a–22n in accordance with a mode designated. After the data conversion is processed in the selected data converting circuit 22i, the data is transmitted to recording means 5 and recorded on the optical card 6. At reproducing, the host computer 3 transmits a data reproducing command and a command for selecting a mode of data conversion at the second data converting means 23 to the optical card recording/reproducing apparatus 21. The data is read from the optical card 6 by reproducing means 7 and transmitted to the second data converting means 23.

At that time, if the mode transmitted from the host computer 3 is identical with the mode at recording, a mode at the second data converting means 23 corresponding to the first data converting means 22 is selected. Then, the data is restored by the data converting circuit 23i corresponding to the mode. The data in which the data converting process is executed at the second data converting means 23 is fed to restoring means 9 for correcting errors. After correcting errors, the data is read by the host computer 3.

In the case in which the selection of the data converting means transmitted to the optical card recording/reproducing apparatus 21 at recording is different from the selection at reproducing, the converting mode at the second data converting means 23 corresponding to the data converting mode at the first data converting means 22 is not selected correctly. Therefore, the data arrangement or a bit value is not correctly reverted. Then, errors cannot be corrected and the data cannot be read.

The optical card recording/reproducing apparatus 21 is formed as mentioned above can actualize different secret-coding without changing the structure of the apparatus 21 by an alteration of a software on the side of the host computer. For example, if the software of the host computer within an application system is made to be the same, the compatibility of a data for different systems is lost and the data can be protected between applications.

Next, the third embodiment will be explained.

Figure 11:
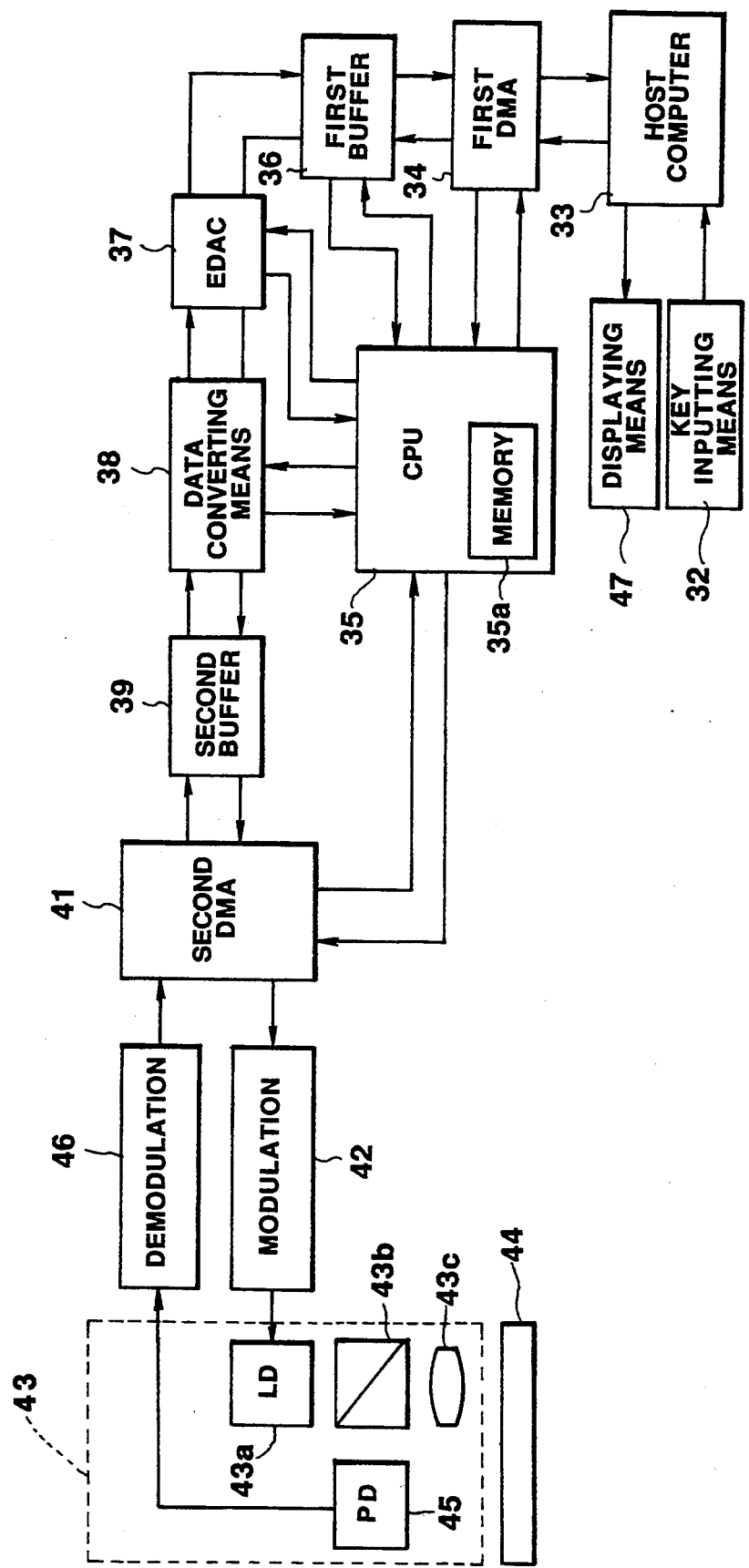
FIG. 11 is a block diagram showing the structure of an optical card recording/reproducing apparatus in the third embodiment of the invention.

In the aforesaid first and second embodiments, a rule of data conversion is set at every host computer and every optical card recording/reproducing apparatus; however, a rule of different data conversion can be set in each optical card. This will be explained concretely on the basis of FIG. 11 as follows. FIG. 11 shows the structure of a controller which controls the recording and reproducing operations of the data from the optical card.

When the data is recorded, the secret number which is input from key inputting means 32 and set in each card from the host computer 33 is stored in a memory 35a within a CPU 35 through a first DMA circuit 34. With the secret number, the data to be recorded is transmitted to a first buffer 36 from the host computer 33 through the first DMA circuit 34.

After an inspection byte for correcting errors is added to the data transmitted to the first buffer 36 by an EDAC circuit 37, the data is transmitted to a data converting circuit 38. The data converting circuit 38 selects a suitable algorithm among a plurality of data converting algorithms in which, for example, a data arrangement is converted on the basis of the secret number stored in the memory 35a within the CPU 35. A plurality of algorithms and a selecting method will be mentioned later.

The data converted in accordance with a selected algorithm is transmitted to a second buffer 39 and stored. The data stored in the second buffer 39 is, next, transmitted to a modulating circuit 42 through a second DMA circuit 41. The modulating circuit 42 converts the data transmitted through the second DMA circuit 41 into a serial writing data and operates modulation for making a laser diode 43a in an optical head 43 arranged against an optical card 44 emit. The amount of emission depends on the recorded data. Then, the modulating circuit 42 optically records the data on the optical card 44 by forming a small beam spot on the optical card 44 through a beam splitter 43b and an objective lens 43c.

When a data is reproduced, the light reflected from the optical card 44 is led to a photo detector 45 within the optical head 43 through the objective lens 43c and the beam splitter 43b. The signal output which is photoelectrically converted by the photo detector 45 is fed to a demodulating circuit 46, so that a data prior to correcting errors is demodulated in a byte unit. Then, the output is loaded in the second buffer 39 which temporarily loads a data through the second DMA circuit 41.

The demodulated data loaded in the second buffer 39 is transmitted to the data converting circuit 38. Next, the data arrangement is inversely converted in the data converting circuit 38 in accordance with the secret number stored in the memory 35a within the CPU 35. Here, if the same secret number as that of the recording time is stored in the memory 35a within the CPU 35, the data arrangement is converted by a completely inverse process of the recording time. Therefore, the error correction at the EDAC circuit 37 can be performed.

If the secret number which is different from that of the recording time is stored, the conversion irrespective of the recording time is executed. Accordingly, the EDAC circuit 37 is impossible to correct errors. In this case, data transmission from the EDAC circuit 37 to the first buffer 36 is prohibited. If it is possible to correct errors in the data transmitted from the data converting circuit 38 to the EDAC circuit 37, the data is temporarily stored in the first buffer 36 and transmitted to the host computer 33 by the first DMA circuit 34. When the data is transmitted, the host computer 33 displays a data read by, for example, displaying means 47.

In the aforesaid structure and operations, a data previously recorded may be reproduced and confirmed that the data can be read without making error correction impossible to identify that the secret number set at recording is correct.

In this way, the secret number of each card is set, so that the information of an individual can be protected.

Next, the fourth embodiment of the invention will be explained. In the aforesaid first to third embodiments, an example in which a data of an information byte is attempted to convert by the rotation is explained. However, the data converting means is not restricted to the aforesaid embodiments and the data conversion shown in FIGS. 12-17 may be executed.

Figure 12A:
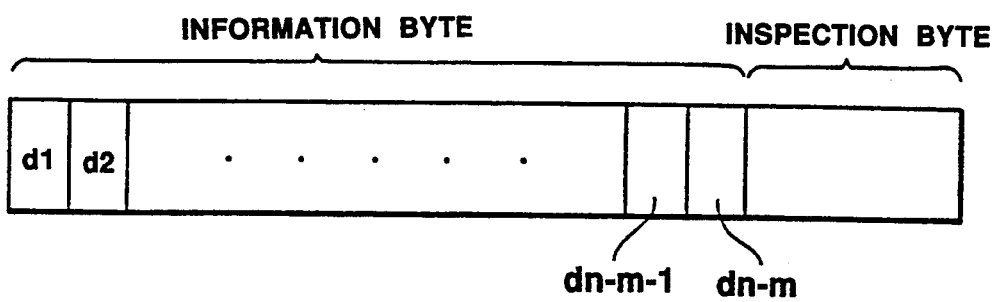
FIGS. 12a–b makes up an explanatory diagram showing an example of data conversion due to rotation by a first data converting circuit in the fourth embodiment.
Figure 12B:
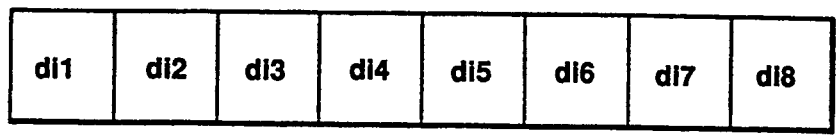
Figure 12C:
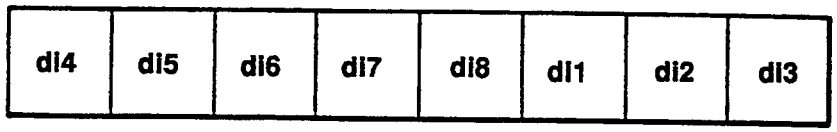

FIG. 12 is an example of the case in which rotation is executed in a bit unit in one byte. FIGS. 12b and 12c show that the ith byte part in the C1 code word in FIG. 12a is extracted. FIG. 12b shows one byte arrangement before the rotation in a bit unit. In the arrangement, the bits are lined from di1 as LSB to di8 as MSB in order. FIG. 12c shows an example of three bits rotation in the left direction for the arrangement in FIG. 12b.

Thus, if the rotation of a bit unit is applied to the information byte, almost all bytes having different data indicating the byte before and after the rotation. Therefore, in the case (except that an inverse process is executed for the data conversion by this rotation), if the data is reproduced, errors are generated exceeding a correcting ability of an error correcting code. Accordingly, the error cannot be corrected, so that a data cannot be read.

Figure 13A:
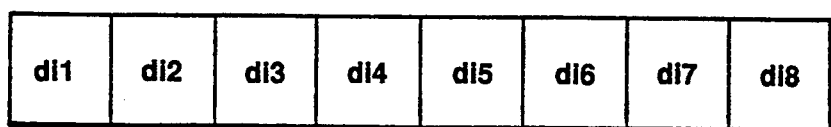
FIGS. 13a and 13b makes up an explanatory diagram showing an example of data conversion due to data replacement in a bit unit by the first data converting circuit.
Figure 13B:
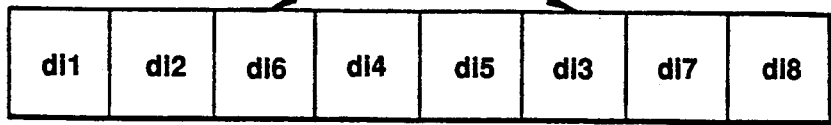

FIG. 13 shows an example of the case in which two bits in each byte are replaced. FIG. 13a shows the ith byte part before the replacement. FIG. 13b shows one byte after the third bit and sixth bit are interchanged for the ith byte in FIG. 13a.

In this example, although two bits are interchanged, the interchange is not restricted to the two bits and random bit numbers of 8 bits and below may be interchanged. In this operation, errors are generated exceeding the correcting ability of the error correcting code at the reproduction because data representing bytes are different between before and after the replacement in most of the bytes. Accordingly, the errors cannot be corrected, so that data cannot be read.

Figure 14A:
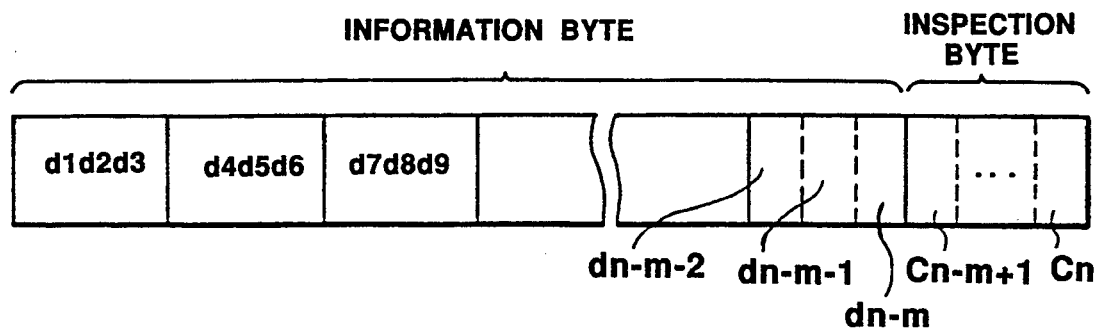
FIGS. 14a and 14b makes up an explanatory diagram showing an example of data conversion due to rotation within each block divided by the first data converting circuit.
Figure 14B:
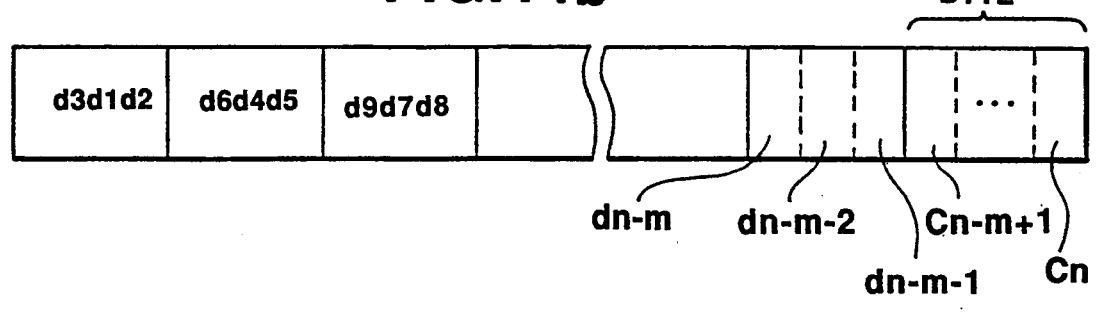

FIG. 14 is an example of the case in which information bytes are divided into a plurality of units and rotation is carried out at every byte unit in each divided unit. FIG. 14a shows a case before the rotation. FIG. 14b shows a state after the rotation in the right direction of one byte in every divided range in which information bytes are divided into groups of three bytes. In this operation, when a data is reproduced, the errors are generated exceeding the correcting ability of the error correcting code because the data representing bytes are different before and after the rotation. Accordingly, errors cannot be corrected and the data cannot be read.

Figure 15A:
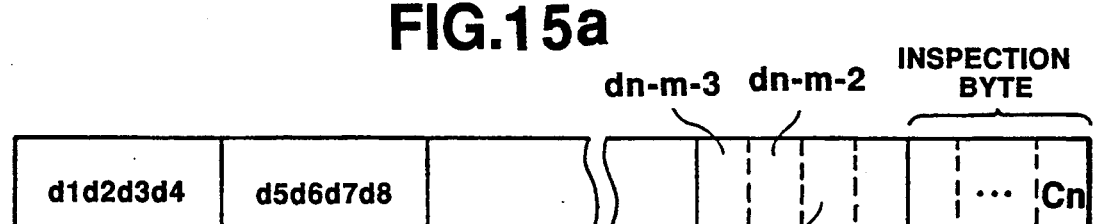
FIGS. 15a and 15b makes up an explanatory diagram showing an example of data conversion due to data replacement within each block divided by the first data converting circuit.
Figure 15B:
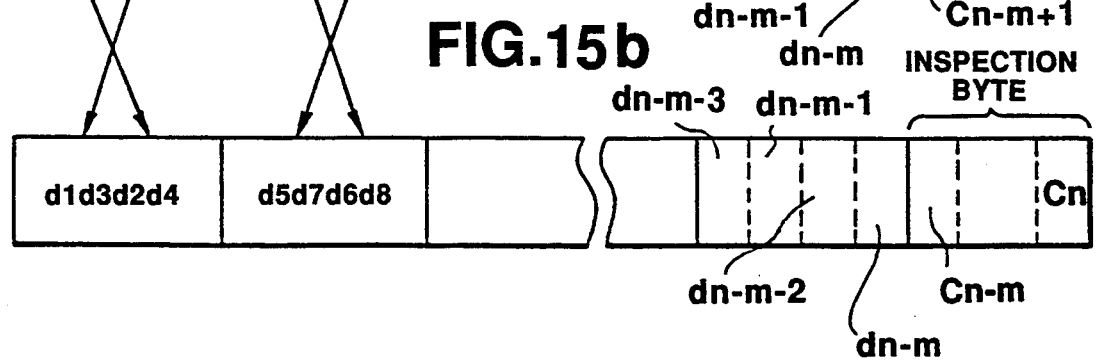

FIG. 15 is an example of the case in which the information bytes are divided into a plurality of units and interchanged at every byte unit in each divided unit. FIG. 15a shows the data arrangement before the interchange. FIG. 15b shows a data arrangement after the second byte is replaced with the third byte in the divided range by dividing the information bytes into groups of four bytes in comparison with FIG. 15a. In this example, if the number of bytes exceeding the error correcting ability of the error correcting code are interchanged, errors cannot be corrected as stated in the aforesaid examples, so that the data cannot be read.

FIG. 16 shows an example in which the whole information bytes are made to be a unit and bytes are interchanged. That is, ith, jth, kth and lth bytes are selected from the data arrangement before the interchange shown in FIG. 16a and interchanged each other to arrange the data as shown in FIG. 16b. Also, by this example, if the number of bytes which exceeds the correcting ability of the error correcting code is interchanged, the error cannot be corrected and the data cannot be read.

Further, this invention can be executed not only by rotation and interchange of a byte and bit as the aforesaid but also by inverting a bit. This example will be explained by reference to FIGS. 17 and 18 below.

Figure 18:
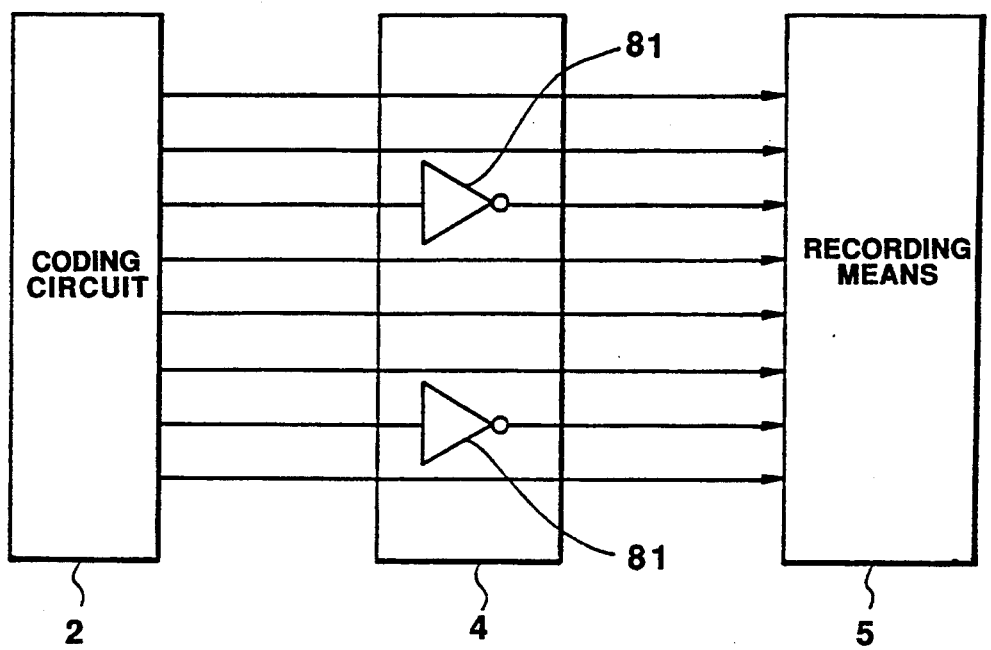
FIG. 18 is a circuit diagram showing the structure of the first data converting circuit corresponding to FIG. 17.

FIG. 17a is a data before converting the data. FIG. 17b is a data after the second bit and sixth bit from LSB are inverted. Thus, a data can be easily inverted. For example, a first data converting circuit 4 may be formed as shown in FIG. 18.

That is, the data of one byte (eight bits) output from the coding circuit 2 is supplied to the first data converting circuit 4. The first data converting circuit 4 has inverts 81 and 81 which invert the second bit and sixth bit from LSB for a data of one byte to be input. Also, the first data converting circuit 4 has the structure for feeding the data as it is to the recording means 5 without inverting the other bits. In this way, such simple structure is able to actualize data conversion. Also, because the data of all bytes are different from the original data, the code words executed by such conversion become impossible to correct errors, so that a data cannot be read as in the aforesaid examples.

The secret-coding algorithm according to this invention is not restricted to the aforesaid embodiments. The aforesaid algorithm may be combined or information bytes may be scrambled on the basis of a regular rule.

Further, the data conversion indicated in the first to fourth embodiments may be applied only to information bytes or may be applied to the whole code words containing information bytes and inspection bytes.

Further, the first and second data converting circuits or the first and second data converting means in the aforesaid embodiments may be composed of hardware, or materialized by a software process within the information recording/reproducing apparatus. Also, the recording medium is not restricted to an optical card and can be applied to a disc-shaped optical recording medium or a recording medium using a magnetic head.

As the aforesaid, according to this invention, a data is recorded by executing a process, such as data rotation, byte interchange or bit inversion in accordance with the data converting process set at every application or every recording medium in order to make error correction impossible. Thus, this invention can securely prevent the recorded data from carelessly reproducing and restoring even if a secret code is not recorded on the recording medium. That is, the invention has an effect in which the recorded data can be securely protected.

What is claimed is:

1. An information recording/reproducing apparatus comprising:

coding means for generating an error detection and correction code for adding inspection information for correcting errors to recording information;

first converting means for providing encryption of information by executing information conversion in accordance with a converting rule previously determined for information output from said coding means;

recording means for recording information output from said first converting means on a recording medium;

reproducing means for reading information recorded on said recording medium and converting the information into electric signals to output the information;

second converting means for providing decryption of information by executing inverse information conversion of said information converted by said first converting means for said electric signals and reproducing restored information; and decoding means for correcting errors of information output from said second converting means by utilizing a characteristic to which said inspection information is added for said restored information output from said second converting means and producing said recording information from said restored information; wherein said first converting means has a function for converting information which generates a number of errors exceeding an error correcting ability by said decoding means without said inverse information conversion by said second converting means.

2. The information recording/reproducing apparatus according to claim 1, wherein said first converting means executes said information conversion which does not change an amount of information before and after said information conversion for the information output from said coding means.

3. The information recording/reproducing apparatus according to claim 1, wherein said first converting means comprises arrangement converting means for converting information arrangement to make the information output from said coding means a determined data arrangement.

4. The information recording/reproducing apparatus according to claim 1, wherein said first converting means comprises arrangement converting means for converting information arrangement to make information, excluding said inspection information, output from said coding means a determined data arrangement.

5. The information recording/reproducing apparatus according to claim 1, wherein said first converting means comprises bit inverting means for performing a process inverting bit values 1 and 0 for a number of bits and a location of bit determined by said converting rule for the information output from said coding means.

6. The information recording/reproducing apparatus according to claim 1, wherein said first converting means comprises arrangement converting means for converting information arrangement into determined data arrangement and means for executing converting means performed by combining bit inverting means for inverting bit values 1 and 0 for a number of bits and a location of bit determined by said converting rule for recording information for the information output from said coding means.

7. The information recording/reproducing apparatus according to claim 1, wherein said converting rule is different according to each type of said information recording/reproducing apparatus.

8. The information recording/reproducing apparatus according to claim 1, further comprising a plurality of said converting rules and being capable of randomly selecting one of said converting rules from a host computer.

9. The information recording/reproducing apparatus according to claim 1, wherein said converting rule is determined by a characteristic secret number corresponding to a recording medium on which information is recorded.

10. The information recording/reproducing apparatus according to claim 1, wherein said recording means includes an optical head for recording information on said recording medium using an optical beam.

11. The information recording/reproducing apparatus according to claim 1, wherein said reproducing means includes an optical head for reproducing information recorded on said recording medium using an optical beam.

12. The information recording/reproducing apparatus according to claim 1, wherein said first converting means and said second converting means are formed by switching a common converting means with each other.

13. The information recording/reproducing apparatus according to claim 1, wherein said recording medium consists of an optical recording medium on which information is recorded by irradiation of an optical beam.

14. The information recording/reproducing apparatus according to claim 13, wherein said optical recording medium consists of a card-shaped optical card.

15. The information recording/reproducing apparatus according to claim 1, further comprising information recording means for recording secret information set corresponding to said recording medium, key inputting means for inputting a secret number and judging means for judging whether said secret number coincides with said secret information.

16. An information recording apparatus comprising:
coding means for generating an error detection and correcting code consisting of adding an inspection byte for correcting errors to recording information;
first converting means for providing encryption of information by executing an information converting process upon said coded recording information for detecting a number of errors which exceeds a correcting capability of said error detection and correcting code in a case in which said inspection byte is added to information output from said coding means in accordance with a converting rule previously determined to record the information wherein said first converting means comprises bit inverting means for executing a process for inverting bit values of 1 and 0 for a number of bits and a location of bit which are determined by said converting rule for the information output from said coding means; and
recording means for recording information output from said first converting means on a recording medium.

17. An information recording apparatus comprising:
coding means for generating an error detection and correcting code consisting of adding an inspection byte for correcting errors to recording information;
first converting means for providing encryption of information by executing an information converting process upon said coded recording information for detecting a number of errors which exceeds a correcting capability of said error detection and correcting code in a case in which said inspection byte is added to information output from said coding means in accordance with a converting rule previously determined to record the information,
wherein said first converting means comprises arrangement converting means for converting information arrangement into a determined data arrangement for the information output from said coding means and means for executing converting means performed by combining bit inverting means for inverting bit values of 1 and 0 for a number of bits and a location of bit determined by a converting rule for recording information; and
recording means for recording information output from said first converting means on a recording medium.

18. An information recording apparatus comprising:
coding means for generating an error detection and correcting code consisting of adding an inspection byte for correcting errors to recording information;
first converting means for providing encryption of information by executing an information converting process upon said coded recording information for detecting a number of errors which exceeds a correcting capability of said error detection and correcting code in a case in which said inspection byte is added to information output from said coding means in accordance with a converting rule previously determined to record the information,
wherein said converting rule is one of a plurality of different converting rules which are applicable to said information recording apparatus; and
recording means for recording information output from said first converting means on a recording medium.

19. The information recording/reproducing method comprising:
a code adding step for generating an error detecting and correcting code for correcting errors to recording information
a first converting step for providing encryption of information by converting information in accordance with a converting rule previously determined for information after said code adding step;
a recording step for recording information after said first converting step on a recording medium;
a reproducing step for reading information recorded on said recording medium and converting the information into electric signals to output the signals;
a second converting step for providing decryption of information by executing inverse information conversion of the information converted by said first converting step and producing restored information; and
a decoding step for processing error correction using a characteristic to which said error correcting code is added and decoding said recording information for information after said second converting step;
wherein said first converting step has a function for converting information which generates a number of errors exceeding an error correcting ability by said decoding step unless said inverse information executes conversion in said second converting step.

* * * * *